United States Patent [19]

Tanaka et al.

[11] Patent Number: 4,674,362
[45] Date of Patent: Jun. 23, 1987

[54] TRANSFERRING DEVICE OF A CAM TYPE

[75] Inventors: Yoshihiro Tanaka; Ryozo Kodama, both of Kyoto, Japan

[73] Assignee: Sankou Senzai Kougyou Kabushiki Kaisha, Kyoto, Japan

[21] Appl. No.: 813,151

[22] Filed: Dec. 24, 1985

Related U.S. Application Data

[63] Continuation-in-part of Ser. No. 633,885, Jul. 24, 1984, abandoned, and a continuation-in-part of Ser. No. 635,105, Jul. 27, 1984, abandoned, and a continuation-in-part of Ser. No. 636,269, Jul. 31, 1984, abandoned.

[51] Int. Cl.$^4$ .................. G05G 1/04; F16H 35/08
[52] U.S. Cl. ........................ 74/833; 74/522; 74/53
[58] Field of Search ............. 74/833, 834, 828, 838, 74/53, 54, 55, 104, 522; 414/749–753

[56] References Cited

U.S. PATENT DOCUMENTS

| | | | |
|---|---|---|---|
| 586,563 | 7/1897 | Parsons | 74/522 |
| 3,829,637 | 8/1974 | Kilcoin | 74/107 |
| 4,300,406 | 11/1981 | Negro et al. | 74/54 |
| 4,328,718 | 5/1982 | Robinson et al. | 74/833 |
| 4,400,985 | 8/1983 | Bond | 414/752 |

FOREIGN PATENT DOCUMENTS

| | | | |
|---|---|---|---|
| 2806507 | 8/1979 | Fed. Rep. of Germany | 74/833 |
| 47555 | 3/1984 | Japan | 74/828 |

Primary Examiner—Lawrence Staab
Attorney, Agent, or Firm—Burns, Doane, Swecker & Mathis

[57] ABSTRACT

A transferring mechanism is arranged to transfer parts from one place to another. The mechanism includes a cam lever which is rotated by a cam. A follower lever is rotatable and has a transfer member (e.g., a chuck) mounted at its free end. A connecting structure has a first connection with the cam lever and a second connection with the follower lever in order to transmit rotary motion from the former to the latter. The first and second connectors are slidable along the cam and follower levers, respectively, in order to change the length of the stroke of the transfer member. A displacement mechanism is connected to the connecting structure for moving the latter and its first and second connections. The displacement mechanism is mounted independently of the cam lever and follower cam.

12 Claims, 20 Drawing Figures

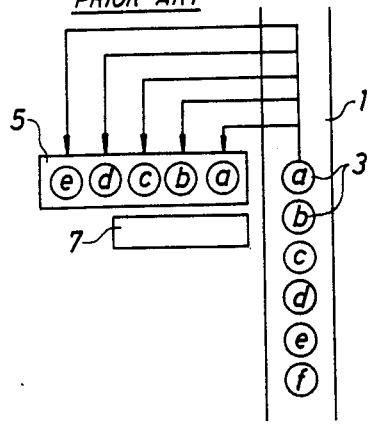
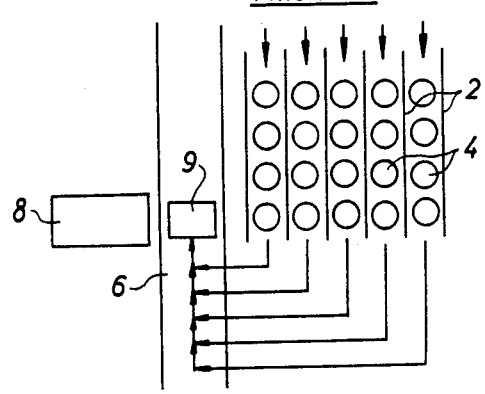
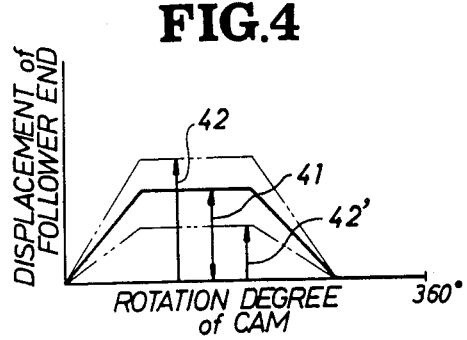
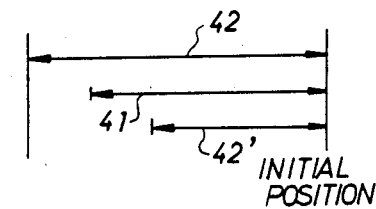
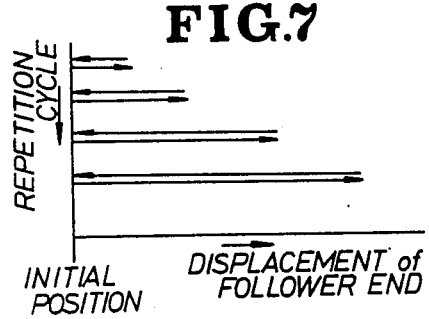
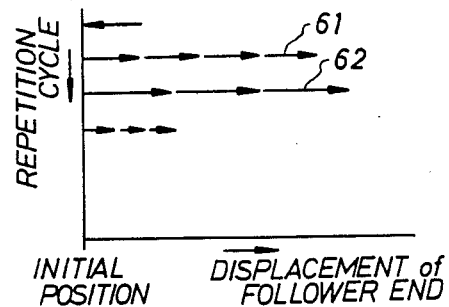

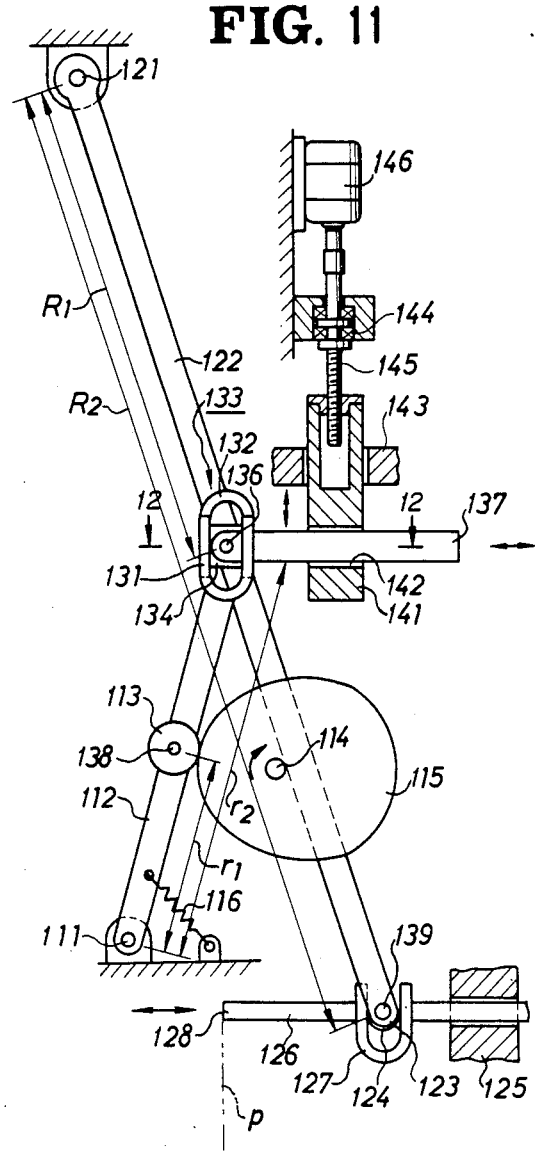
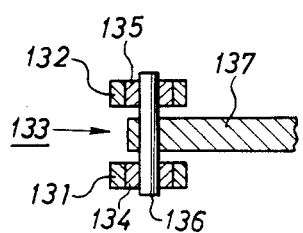
FIG. 11
FIG. 12

TRANSFERRING DEVICE OF A CAM TYPE

RELATED INVENTIONS

This is a continuation-in-part of U.S. application Ser. No. 06/633,885, filed July 24, 1984, and now abandoned; U.S. application Ser. No. 06/635,105 filed July 27, 1984 and now abandoned; and U.S. application Ser. No. 06/636,269, filed July 31, 1984 and now abandoned.

BACKGROUND AND OBJECTS OF THE INVENTION

The present invention relates to a transferring device of a cam type for use in automatic assembling or the like.

Generally, a line for automatically assembling various types of products (as shown in FIGS. 1 and 2), e.g., see part 9 in FIG. 2, requires a transferring device 7 (or 8) that can transfer parts 3 (or 4) on a conveyor 1 (or a part table 2) one by one, or few by few, to an assembling table 5 (or a conveyor 6) with respectively changing transferring distances. Further, the device is required to return to a constant initial position.

FIG. 1A illustrates an unequal pitch index machine which has already been developed for intermittently transferring pallets. In this machine, rotation of a motor 1A is transmitted through an unequal pitch index device 2A to a drive shaft 4A of a timing belt 3A. The belt 3A intermittently transfers jigs 5A on which many pallets 6A are located. During the transference, a locating pin 7A locates and positions the jigs 5A. Works are supplied to a position P by a picking and placing unit (hereinafter referred to as PPU) which picks-up the works on the pallet 6A and transfers them to the position P. This PPU comprises a transferring mechanism which reciprocates between the work supply position P and the pallets in rows along picking-out line 8A (a center line of PPU) shown in FIG. 2A.

As shown in FIG. 2A, an operation starts when the center of the pallets at the right end row aligns with the picking-out line 8A. The unequal pitch index machine intermittently drives the belt four times with pitches of x1. During each stoppage, PPU reciprocates different strokes l1, l2, l3 and l4 on the picking-out line 8A to transfer the works on each pallet 6A to the work supplying position P, and thus, the works in all pallets 6A on the jig 5A can be taken out. When the taking-out operation on the line 8A is completed in the pallets at the left end row on the jig 5A, the unequal pitch index machine 2A drives the timing belt 3A a length of $s+\alpha$, and a new pallet filled with the works is conveyed to the initial position and stopped there.

Transferring devices having driving mechanisms of the cam type are known which are suitable for use with automatic assembling devices of the types described above, especially in high speed operations, but they are not able to change the displacement in order to accommodate different transferring distances.

Accordingly, it is an object of the invention to provide such transferring device of the cam type that can transfer parts one by one, or few by few, and is able to change the transferring distance and can always return to an initial position.

SUMMARY OF THE INVENTION

These objects are achieved by the present invention which involves a transferring mechanism comprising a cam lever rotatably supported by a fixed member through a support shaft. A follower lever is rotatably supported by a fixed member through a support shaft parallel to the cam lever support shaft. A cam is provided for driving and swinging the cam lever through a cam follower. A transfer mechanism is provided at the end of the follower lever. A connecting structure has a first connection with the cam lever and a second connection with the follower lever for transferring rotary motion from the cam lever to the follower lever. The first and second connections are slidable along the cam lever and follower lever, respectively, to change the stroke length of the transfer member. A displacement mechanism is provided for displacing the connecting structure in order to simultaneously shift the first and second connections. The displacement mechanism is mounted independently of the cam lever and follower lever and is operatively connected to the connecting structure.

The connecting structure may comprise a middle link extending between the cam and follower levers along the direction of travel of those levers as they swing about their axes. The sliding connections comprise slides which are slidably mounted in seats carried by the cam and follower levers.

The displacement mechanism comprises a guide which is slidable. The middle link slides within the guide and is moved by the guide to displace the connections. The guide can be moved by manual or motorized actuators.

The seats on the cam and follower levers can be arranged to rotate about secondary axes as the cam and follower levers rotate, in order to maintain their slide guide paths mutually parallel.

The connecting structure may comprise a shaft oriented parallel to the axes of rotation of the cam and follower levers. That shaft is rotatably connected to the slides about a common axis of rotation. An arm is fixed to the shaft and extends therefrom to a connection with the displacement mechanism.

The displacement mechanism may comprise a lever pivoted at its midpoint and having one end connected to a guide. The guide is connected to the connecting structure. The other end of the lever bears against a cam. The cam is rotatable such that a different peripheral portion thereof contacts the lever to swing the lever and thereby displace the connecting structure.

BRIEF DESCRIPTION OF THE DRAWINGS

The objects and advantages of the invention will become apparent from the following detailed description of preferred embodiments thereof in connection with the accompanying drawings, in which like numerals designate like elements, and in which:

FIGS. 1, 1A, 2, 2A are schematic plan views of conventional assembling lines;

FIG. 4 is a diagram depicting an operation of the device of FIG. 3;

FIG. 5 is another diagram depicting a further operation of the device of FIG. 3;

FIG. 7 is a diagram of an operation of the device of FIG. 6;

FIG. 8 is another diagram depicting a further operation of the device of FIG. 6;

FIG. 11 is a schematic elevational view of a third embodiment of a transferring device of a cam type according to the invention with certain parts cut-away for clarity;

FIG. 12 is a sectional view of a device taken along line 12—12 in FIG. 11;

DETAILED DESCRIPTION OF PREFERRED EMBODIMENTS OF THE INVENTION

Figure 1A:
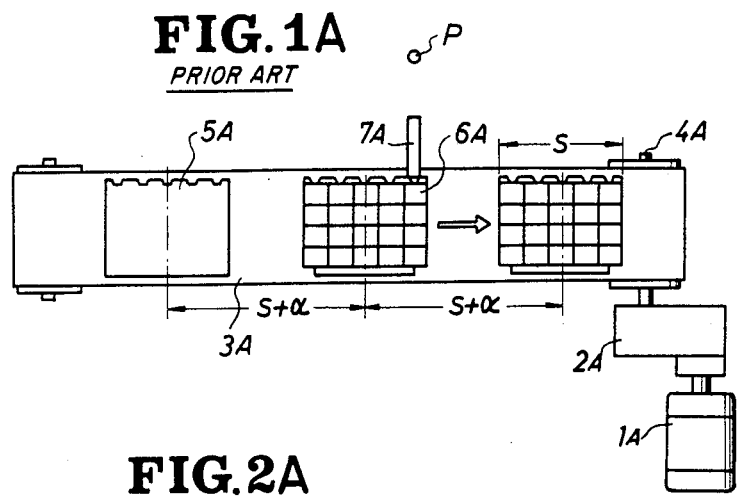

First and second embodiments of the invention will be described in connection with an apparatus of the type depicted in FIGS. 1 and 2. In a first embodiment, depicted in FIG. 3, a bearing 11 on a fixed member supports a base end of a cam lever 13 through a support shaft 12 which is fixed to the lever 13. A middle portion of the cam lever 13 supports a cam follower 16 through a shaft 17. The follower 16 is forced by a spring (not shown) to contact a peripheral surface of a cam 15, which is driven by a cam shaft 14 at a fixed position. The cam lever 13 is provided at its free end with a U-shaped slider seat 18, in which a slider 21 is slidably fitted. The slider 21 is rotatably connected to an end of a connector in the form of a middle link 19 by a pin 20. A slider 23 is rotatably connected to the other end of the middle link 19 by a pin 22. The slider 23 is slidably fitted in an inversely U-shaped slider seat 25 provided at the middle of a follower lever 24. The middle link 19 and the sliders 21, 23 thus form a connecting structure for transferring rotary motion from the cam lever to the follower lever.

The follower lever 24 is rotatably supported at the base end to a fixed bearing 27 by means of a follower support shaft 26 which is fixed to the lever 24 and disposed oppositely to the cam lever support shaft 12, with the middle link 19 located therebetween. The follower lever 24 is provided at its free end with a follower end 28 for performing a displacement. A slider 30 is rotatably connected to the follower end 28 by a pin 29, and is slidably fitted in a U-shaped slider seat 33. The seat 33 is rigidly mounted on a rod 32 which is horizontally (or longitudinally) slidably supported by a fixed guide 31. Although not shown, the rod 32 is provided at the end with a chuck, holder, pusher, or the like, for handling parts to be transferred and assembled.

Figure 3:
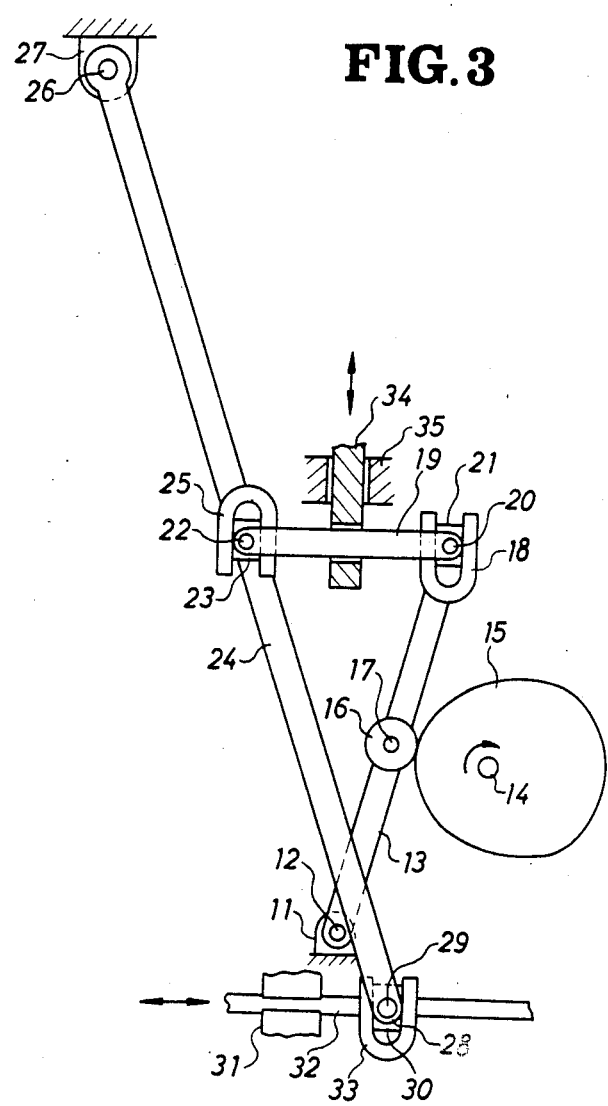
FIG. 3 is a schematic elevational view of a transferring device of a cam type according to a first embodiment of the invention.

The middle link 19 is supported and guided by a guide 34 so that the link 19 may be slidable in a direction parallel to the rod 32. The guide 34 is supported slidably in upward and downward directions by a fixed guide 35, so that the link 19 can slide relative to the slider seats 18 and 25. The guide 34 is moved upwardly and downwardly manually or by a motor and thus comprises a displacement mechanism mounted independently of the cam lever and the follower lever for displacing the link 19. The slider seat 18 at the cam lever side and the slider seat 25 at the follower lever side are so fixed to the levers 13 and 24, e.g., by welding, that they will be parallel to each other when they return to a neutral position as illustrated in FIG. 3. Namely, the parts and members are arranged so that the slider seats 18 and 25 guide the sliders 21 and 23 in a direction perpendicular to the displacement direction of the rod 32 when the follower end 28 is in the neutral position (returned position) as shown in FIG. 3.

IN OPERATION of the apparatus depicted in FIG. 3, when the cam 15 rotates to move the cam follower 16, the cam lever 13 swings around the shaft 12, so that the middle link 19 linearly moves to swing the follower lever 24 around the shaft 26, and thus, the rod 32 moves linearly. In order to change the length of the displacement of the rod 32, the link 19 is displaced vertically while the components are in the neutral position of FIG. 3.

When the middle link 19 is shifted upwardly by the guide 34, the distance between the shaft 12 and the slider 21 increases with respect to the fixed distance between the shaft 12 and the cam follower 16, and thus, the leverage of the cam lever 13 increases. Further, although the distance between the shaft 26 and the slider 23 decreases, the distance between the shaft 26 and the follower end 28 is fixed. Therefore, the leverage of the follower lever 24 increases. Consequently, the length of the displacement of the follower 28 which is a product of the displacement of the cam 15 and the leverage of the levers 13 and 24, increases. On the contrary, when the link 19 is shifted downwardly, the leverage of the levers 13 and 24 decreases for a similar reason, so that the displacement of the follower end 28 decreases. Those relationships are illustrated in FIG. 4, wherein numeral 41 indicates a standard stroke, and the numerals 42 and 42' indicate increased and decreased strokes, respectively. When the middle link 19 is arranged at the middle point of the follower lever 24, a slight movement of the guide 34 causes a large displacement of the follower end 28.

Although the displacement of the follower end 28 is changed by the vertical movement of the middle link 19, this vertical movement does not move the slider seat 25, because the slider seats 18 and 25 are parallel to each other in the neutral position in FIG. 3. Therefore, the follower end 28 always returns to the predetermined neutral position. Those relationships are illustrated in FIG. 5. Although stroke control of general robots are applied to a full stroke, the control according to the invention is applied to the variable stroke.

Figure 6:
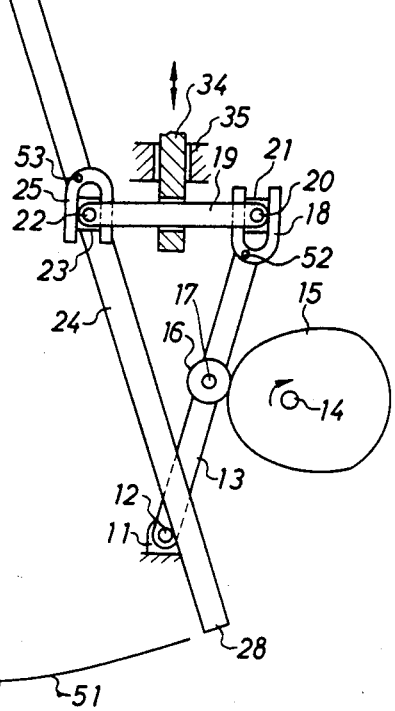
FIG. 6 is an elevational view of a second embodiment of the invention.
Figure 6A:
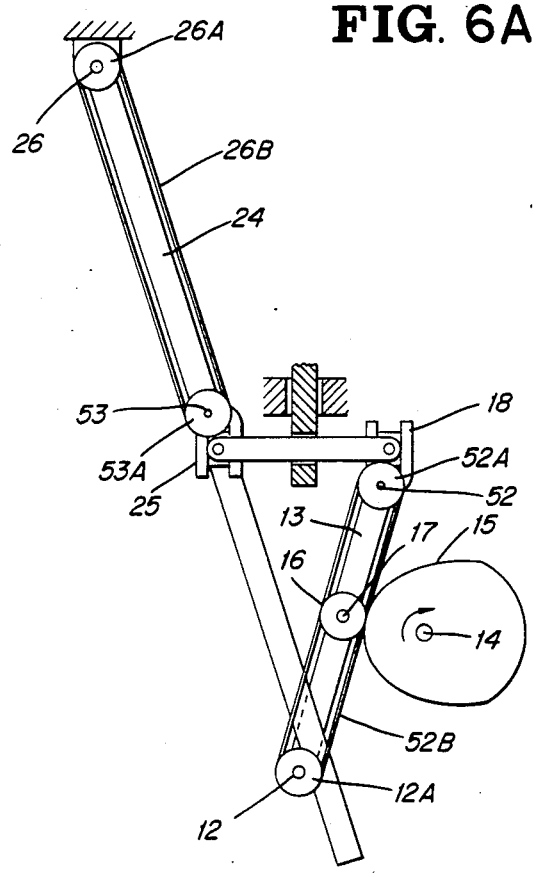
FIG. 6A is a view similar to FIG. 6, depicting schematically a pulley-belt mechanism for keeping the seats vertical.

FIG. 6 illustrates a second embodiment of the invention, in which certain ones of the components depicted in the embodiment of FIG. 3 are omitted, such as the slider 30 at the follower end 28, the slider seat 33 and the rod 32, so that the displacement 51 is arcuate, i.e., is generated about the pivot 26. Common members in FIGS. 3 and 6 bear the same reference numerals and repeat description thereof is omitted. However, slider seats 18 and 25 are so arranged that they may be oriented vertical independently of the position of the follower end 28. A mechanism for always keeping the slider seats 18 and 25 vertical may be constructed as follows. Referring to FIG. 6A, the seats 18 and 25 are rotatably supported on levers 13 and 24 by being fixed to shafts 52, 53, respectively, which shafts are rotatably mounted on the levers 13, 24, respectively. The levers 13, 24 are rotatably mounted on shafts 12, 26, respectively, which shafts are connected to suitable support members so as to be fixed against rotation. Pulleys 12A and 26A are fixedly mounted on the shafts 12, 26, respectively, and are thus also held against rotation. Pulleys 52A, 53A are fixed to the shafts 52, 53 and are thus able to rotate therewith. An endless belt 52B is retained around the pulleys on the shafts 52 and 12. Another endless belt 26B is retained around the pulleys on the shaft 53 and 26. The belts can be of the toothed type which positively mesh with teeth on the pulleys. As the levers 13, 24 rotate, the pulleys 12A and 25A remain stationary whereby the belts 52B, 26B will rotate in a manner rotating the pulleys 52A, 53A and thus also the seats 18, 25 carried by the shafts 52, 53. The rotation of the seats 18, 25 occurs in a direction whereby slide guide paths carried by the seats will remain vertical (e.g., as the lever 13 rotates counterclockwise in FIG. 6A, the belt 52B rotates clockwise to rotate the pulley 52A and seat 18 clockwise.

Although, in the embodiments described in connection with FIGS. 3 and 7, the U-shaped slider seats 18 and 25 are provided on the levers 13 and 24, and the sliders 21 and 23 are provided at both ends of the middle link 19, the invention is not restricted to such an arrangement. For example, U-shaped sliders may be provided at both ends of the middle link 19, and slider seats fitted into the U-shaped sliders may be provided on the levers 13 and 24.

Figure 9:
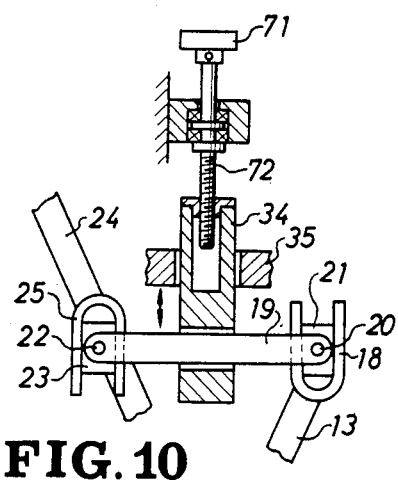
FIG. 9 is a schematic sectional view of a manual driving mechanism for a guide of the invention.

In order to displace the guide, a feed screw 72 provided with a handle wheel 71 is connected to the guide 34 (FIG. 9). The handle wheel 71 is turned in order to move the guide 34 upwardly or downwardly, so that displacement of the follower end 28 may be varied in a so-called single operation stage.

For automatically moving the guide 34 (shown in FIG. 10), an actuator such as a servo-motor or stepping motor 73, synchronized to the rotation of the cam 14, may be connected to the guide through a feed screw 74. The motor 73 moves the guide 34 to vary and adjust the displacement of the follower end 28 in a one cycle operation.

Figure 10:
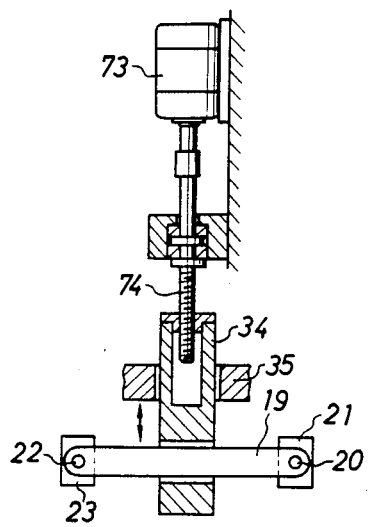
FIG. 10 is a schematic sectional view of a powered driving mechanism for a guide of the invention.

According to the mechanism in FIG. 10, the displacement of the follower end 28 may be varied in the one cycle operation (shown in FIG. 7). According to the mechanisms in FIGS. 9 and 10, such operation may be performed as shown in FIG. 8. Namely, after a transference operation of a predetermined displacement 61 is performed M times, a transference operation of a different displacement 62 may be repeated N times.

According to the invention, as detailed hereinabove, the guide can be easily moved upwardly and downwardly to change the displacement distance of the follower end driven by the cam. Therefore, the transference length of the parts may be changed one by one, or few by few, in an automatic assembling machine of the cam drive type. Further, since the slider seats and the follower lever sides are arranged parallel in at least the neutral position, the follower end surely returns to the neutral position independently of the displacement of the follower end, namely, the transference length, which is optimum for the automatic assembling. The operation time for changing the work stage can be reduced. The operation for changing the work stage can be automated (numerically controlled by the servo-motor or others), and mixed or combined lines can be constructed.

Figure 2A:
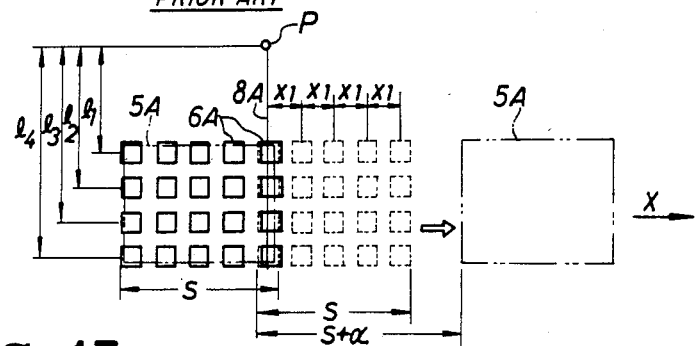

A third embodiment of the invention, depicted in FIGS. 11 and 12, is for use in connection with appratus depicted in FIGS. 1A and 2A. In that embodiment, a support shaft 111 on a fixed member supports a lower end of a cam lever 112. A middle portion of the cam lever 112 supports a cam follower 113 through a shaft 138. The follower 113 is forced by a spring 116 to contact a peripheral surface of a cam 115, which is driven by a cam shaft 114 at a fixed position. When the cam 115 rotates, the lever 112 is swung around the support shaft 111 as an axis.

A follower lever 122 is rotatably supported at its upper end by a support shaft 121 at a fixed position. The follower lever 122 is provided at its lower free end with a follower end 123 for performing a transference stroke to transfer a part. The follower end 123 supports a shaft of a roller 124, which is slidably fitted in a U-shaped slider seat 127. The seat 127 is fixed to a rod 126 which is supported linearly slidably by a guide 125. The left end of the rod 126 forms an output end 128, which is fixed or connected to a work holder mechanism (not shown) operable to move upwardly and downwardly.

A U-shaped guide 131 and an inverted U-shaped guide 132 for changing leverages are fixed to the end of the cam lever 112 and the middle portion of the follower lever 122, respectively. Both guides 131 and 132 are parallel to each other at an initial or neutral position depicted in FIG. 11. As shown in FIG. 12, sliders 134 and 135 of a connector 133 are slidably fitted into guides 131 and 132 for changing the leverages. The sliders 134 and 135 are rotatably supported by both ends of a shaft 136, the middle portion of which is fixed to an operation arm 137. The shaft 136 and the slides 134, 135 form a connecting structure for transmitting rotary motion from the cam lever to the follower lever. The shaft 136 is rotated relative to the slides about a common axis disposed parallel to the shafts 121, 111. When the connector 133 is moved along the guides 131 and 132, a distance r2 between the shafts 111 and 136 changes, while a distance r1 between the shafts 111 and 138 does not change, so that the leverage r2/r1 of the cam lever 112 changes. Further, a distance R1 between the shafts 121 and 136 changes, while a distance R2 between the shafts 121 and 139 does not change, so that a leverage R2/R1 of the follower lever 122 changes.

The arm 137 of the connector 133 is slidably inserted into an aperture 142 of a guide 141. The guide 141 is operable to move the connector 133 along the guides 131 and 132 for changing the leverages r2/r1 and R2/R1 of the levers 112 and 122. The guide 141 is slidably fitted into a guide member 143 and is thus mounted independently of the cam lever and follower lever. The upper end of the guide 141 is screwed to a feed screw 145 which is rotatably carried by a thrust bearing 144 on a fixed member. A servo-motor or a stepping motor 146 synchronized to the rotation of the cam shaft 114 is connected to the feed screw 145 to turn the screw 145 for moving the guide 141 upwardly or downwardly.

In operation, when the cam 115 turns, the cam lever 112 swings around the support shaft 111. The movement of the guide 131 on the lever 112 is transmitted through the slider 134, the shaft 136 and the slider 135 of the connector 133 to the guide 132 of the follower lever 122, so that the lever 122 swings. Thus, the rod 126 supported by the guide member 125 reciprocates linearly, and the output end 128 performs a transferring operation.

In the initial or neutral position in FIG. 11, the follower lever 122 is in the right-end position. In this position, when the feed screw 145 is rotated by the motor 146 synchronized to the rotation of the cam shaft 114, the connector 133 is moved upwardly by the guide 141 driven by the screw 145, so that the leverage r2/r1 of the cam lever 112 increases and the leverage R2/R1 of the follower lever 122 also increases. Consequently, the displacement of the follower lever 123, which is a product of the displacement of the cam 115 and the leverages (r2/r1) (R2/R1) of the levers 113 and 122, increases, and thus, the transferring stroke of the output end 128 of the rod 126 increases. On the contrary, when the connector 133 is shifted downwardly by the guide 141, the stroke of the output end 128 decreases for a similar reason.

Further, both guides 131 and 132 surely become parallel to each other in the returned initial position in FIG. 11. Therefore, even if the connector 133 is shifted along the guides 131 and 132, neither of the guides 131 and 132 is shifted by the connector 133 with respect to the other. Therefore, the output end 128 is surely returned to the constant initial position p, namely, the position P in FIGS. 1A and 2A for supplying the parts to the automatic assemblying machine.

Figure 13:
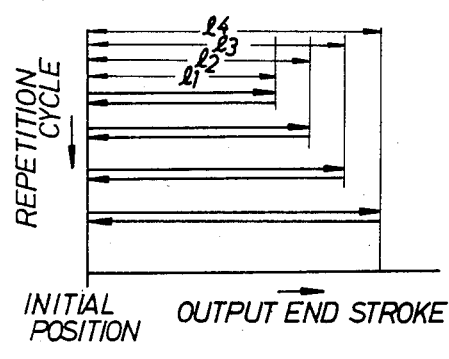
FIG. 13 is a diagram explaining a control operation of the device in FIG. 11.
Figure 14:
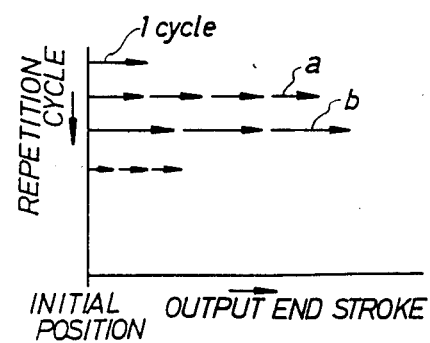
FIG. 14 is a further diagram explainging a control operation of the device in FIG. 11.

This device can be used in PPU for the unequal pitch index machine in FIGS. 1A and 2A. In this use, the stroke of the output end 128 can be controlled as follows. The strokes of the output end 128 may be successively changed into l1, l2, l3, and l4 in accordance with respective cycles as shown in FIG. 13. Further, as shown in FIG. 14, after the transferring operations of the predetermined stroke (a) are performed a plurality of times, the stroke can be changed into a new value of (b) to repeat another transferring operation. The stroke, operation cycle and others can be changed appropriately.

In order to change the stroke of the output end for a single operation, a manual handle wheel may be substituted for the motor 146 in the embodiment in FIG. 11. As a substitution for the means including the motor 146 and the feed screw 145, another cam mechanism synchronized to the cam shift 114 may be employed so as to automatically shift the guide 141 in synchronization with the rotation of the cam shaft 114.

According to the invention, as detailed hereinbefore, the connector can be easily moved upwardly and downwardly to change the displacement distance of the follower end driven by the cam. Therefore, the transference length of the parts may be changed one by one, or few by few, in an automatic assembling machine of the cam drive type. Further, since the guides at the cam lever side and the follower lever side are arranged parallel at least in the neutral position, the follower end surely returns to the initial position independently to the reciprocating stroke of the follower end, which is optimum for the automatic assembling machine having a fixed work supplying position. Further, such a structure can be simple and inexpensive.

Figure 15:
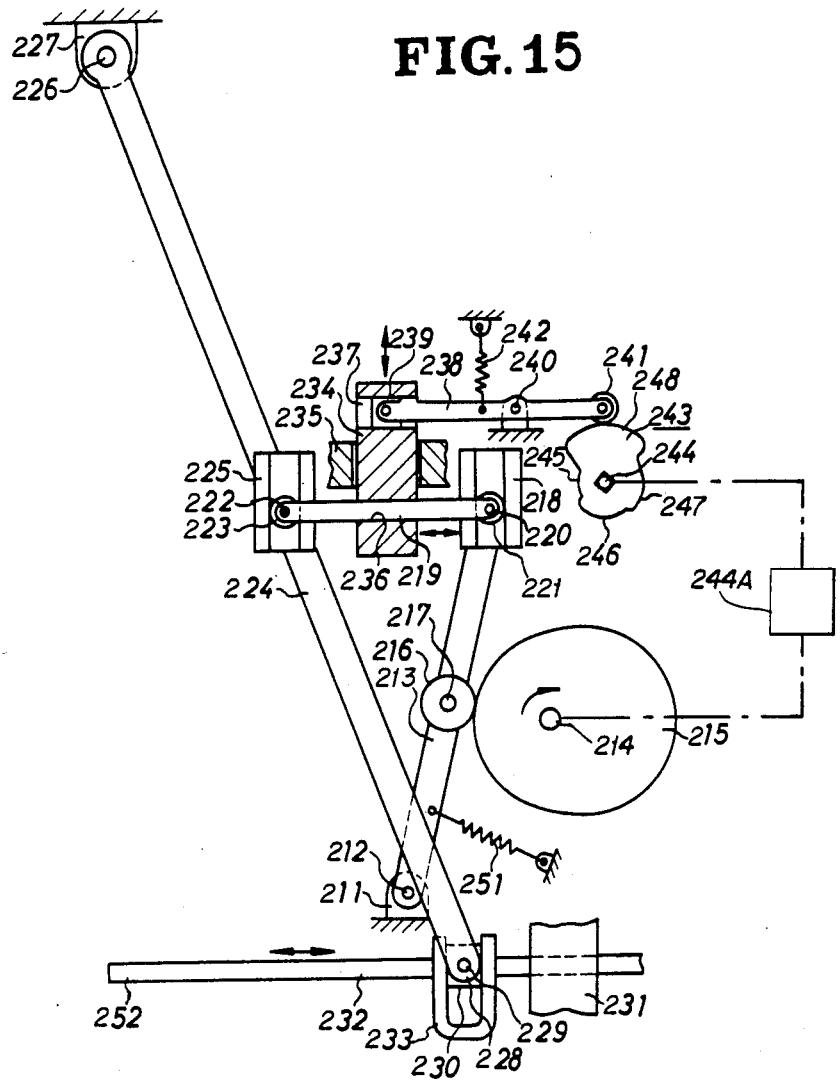
FIG. 15 is a schematic elevational view of a fourth embodiment of a transferring device of a cam type according to the invention, with certain parts cut-away for clarity.

A fourth preferred embodiment according to the present invention is depicted in FIG. 15. In that embodiment, a bearing 211 on a fixed member supports a base end of a cam lever 213 through a support shaft 212. A middle portion of the cam lever 213 supports a cam follower 216 through a shaft 217. The follower 216 is forced by a spring 251 to contact a peripheral surface of a cam 215, which is driven by a cam shaft 214 at a fixed location. The cam lever 213 is provided at its free end with an H-shaped slider seat 218, in which a slider 221 of a roller type is slidably fitted. The slider 221 is rotatably connected to an end of a middle link 219 by a pin 220. A slider 223 of a roller type is rotatably connected to the other end of the middle link 219 by a pin 222. The slider 223 is slidably fitted to an H-shaped slider seat 225 provided at the middle of a followr lever 224. The slides 221, 223 and the middle link 219 form a connecting structure for transmitting rotary motion from the cam lever to the follower lever.

The follower lever 224 is supported at its base end by a fixed bearing 227 through a follower support shaft 226 which is disposed oppositely to the cam lever support shaft 212, with the middle link 219 located therebetween. The follower lever 224 is provided at its free end with a follower end 228 for performing a transferring displacement. A slider 230 is rotatably connected to the follower end 228 through a pin 229, and is slidably fitted in a U-shaped slider seat 233. The seat 233 is rigidly mounted on a rod 232 which is horizontally (or lengthwise) slidably supported by a fixed guide 231. Although not shown, the rod 232 is provided at the end 252 with a chuck, holder, pusher or the like for handling parts to be assembled.

The middle link 219 is supported and guided by a guide 234 so that the link 219 may be slidable in a direction parallel to the rod 232. The guide 234 is supported slidably in an upward and downward direction by a fixed guide 235, so that the link 219 can slide along the slider seats 218 and 225. The guide is thus mounted independently of the cam lever and the follower lever. The slider seat 218 at the cam lever side and the slider seat 225 at the follower lever side are so fixed to the levers 213 and 224 that they are oriented parallel to each other when they return to an initial or neutral position as illustrated in FIG. 15. Namely, the parts and members are arranged so that the slider seats 218 and 225 may guide the slides 221 and 223 in a direction perpendicular to the displacement direction of the rod 232 when the follower end 228 is in the initial position (returned position) shown in FIG. 15.

The guide 234 is provided with a sliding groove 237 arranged parallel to a guide port 236 in which the middle link 219 slides. A slider 239, rotatably supported by an end of a control lever 238, is fitted into the groove 237. The control lever 238 is rotatably supported at its center by a shaft 240 located at a fixed position. The lever 238 supports a cam follower roller 241 at its other end. The cam follower roller 241 is pressed by a spring 242 against an outer periphery of a cam 243 for changing the stroke of rod 252. The cam 243 is fixed to a cam shaft 244 which is driven by a motor or a manual force. The outer peripheral surface of the cam 243 is quartered into arc surfaces 245, 246, 247 and 248, respectively, having mutually different radii of curvature with respect to the cam shaft 244. These arc surfaces 245, 246, 247 and 248 are shaped for achieving a particular changing of the stroke of the output end 252 of the rod.

In operation, when the cam 215 rotates to move the cam follower 216, the cam lever 213 swings around the shaft 212, so that the middle link 219 linearly moves to swing the follower lever 224 around the shaft 226. Thus, the rod 232 moves linearly to perform a transferring operation by means of the output end 252.

When a changing of the stroke is commanded by an external signal, the motor (or whatever mechanism is employed for driving the cam 215) rotates the cam shaft 244 to bring one of the arc surfaces 245, 246, 247 and 248 into contact with the cam follower roller 241. The control lever 238 is thus turned to move the guide 234 upwardly or downwardly, and thus the guide 234 moves the middle link 219. When the middle link 219 is shifted upwardly by the guide 234, the distance between the shaft 212 and the slider 221 increases with respect to the fixed distance between the shaft 212 and the cam follower 216, and thus, the leverage of the cam lever 213 increases. Further, although the distance between the shaft 226 and the slider 223 decreases, the distance between the shaft 226 and the follower end 228 is fixed. Therefore, the leverage of the follower lever 224 increases. Consequently, the displacement of the follower 228, which is a product of the displacement of the cam 215 and the leverage of the levers 213 and 224, increases, and thus, the transferring stroke of the output end 252 of the rod 232 increases. On the contrary, when the link 219 is shifted downwardly, the leverage of the levers 213 and 224 decreases for a similar reason, so that the displacement of the follower end 228 decreases. As detailed above, the stroke can be changed during one cycle. If the cam 243 is replaced with another one having different radii, different displacements can be obtained.

Although the displacement of the follower end 228 is changed by the vertical movement of the middle link 219, this vertical movement does not move the slider seat 225, because the slider seats 218 and 225 are parallel to each other in the initial or neutral position of FIG. 15. Therefore, the follower end 228 always returns to the predetermined initial position.

Figure 16:
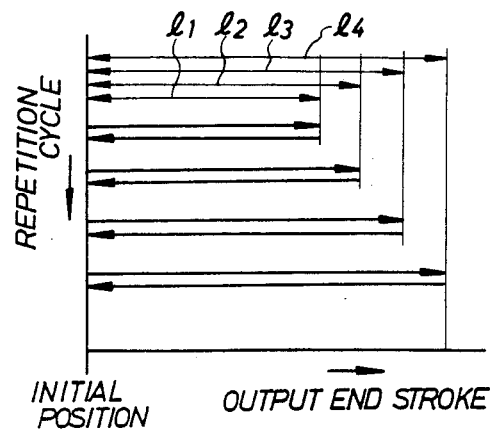
FIG. 16 is a diagram explaining an operation of the device of FIG. 15.
Figure 17:
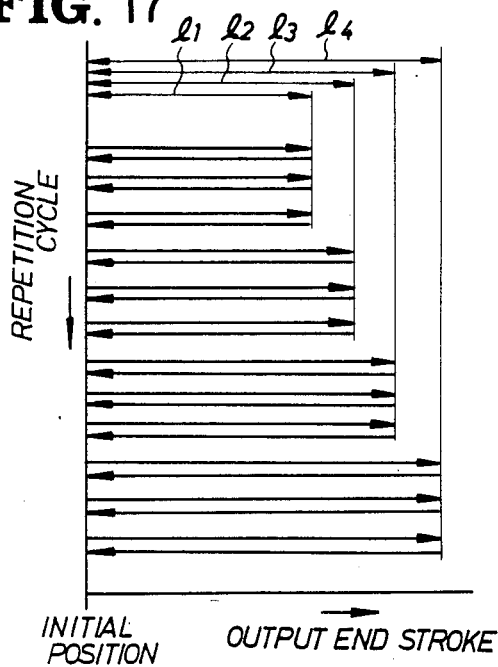
FIG. 17 is a further diagram explaining an operation of the device of FIG. 15.

In use of this embodiment, as shown in FIG. 16, strokes l1, l2, l3 and l4 of the output end 252 are changed in accordance with each stroke. As shown in FIG. 17, after transferring operations of the predetermined stroke l1 are performed a plurality of times, the stroke is successively changed to repeat transferring operations of the different strokes l2, l3 and l4.

Although, in this embodiment, the H-shaped slider seats 218 and 225 are mounted on the levers 213 and 224, and the sliders 221 and 223 are mounted at both ends of the middle link 19, modifications are possible. For example, H-shaped slider seats may be provided at both ends of the middle link 219, and sliders of the roller type may be mounted on the levers 213 and 224 and fitted in the seats. The lever may be designed to directly take out the transferring force from the follower end 228.

The shape of the cam 243 for changing the stroke may be changed to change the repetition cycle into five or more stages.

According to the invention, as detailed hereinbefore, the middle link can be easily moved upwardly and downwardly to change the displacement distance of the follower end driven by the cam. Therefore, the transference length of the parts may be changed one by one, or few by few, in an automatic assembling machine of the cam drive type. Further, since the slider seats at the cam lever side and the follower lever side are arranged parallel in at least the initial position, the follower end surely returns to the initial position independently of the displacement of the follower end, namely, the transference length, which is optimum for the automatic assembling. The operation time for changing the work stage can be reduced. The operation for changing the work stage can be automated (e.g., numerically controlled by the servo-motor or others), and mixed or combined lines can be constructed.

Since the guide is designed to be driven by the cam for changing the stroke, the strokes can be changed easily by the cam associated to an inexpensive servo-control mechanism, if the strokes are predetermined. A conventional synchronizing mechanism 244A can be connected to the motors for driving the cams 243 and 215 in order to shift the cam 243 in a desired predetermined relationship with the rotation of the cam 215. Similar mechanisms can be employed with the earlier-described apparatus of FIGS. 3, 6, 10 and 11.

Although the present invention has been described in connection with preferred embodiments of the invention, it will be appreciated by those skilled in the art that modifications, substitutions, additions, and deletions not specifically described, may be made, without departing from the spirit and scope of the invention as defined in the appended claims.

What is claimed is:
1. A transferring mechanism comprising:
 a cam lever rotatably mounted at a first end thereof about a first axis of rotation,
 a follower lever rotatably mounted at a first end thereof about a second axis of rotation spaced from, and oriented parallel to, said first axis of rotation,
 transfer means connected to a second end of said follower lever for being displaced stroke-wise during rotation of said follower lever about said second axis of rotation,
 cam means for engaging said cam lever for rotating said cam lever about said first axis of rotation,
 connecting means having a first connection with said cam lever and a second connection with said follower lever for transferring rotary motion from said cam lever to said follower lever,
 said first connection being slidable generally along the length of said cam lever, and said second connection being slidable generally along the length of said follower lever, in order to change the stroke length of said transfer means per unit rotation of said cam lever,
 displacement means for displacing said connecting means to simultaneously slide said first and second connections along said cam lever and follower lever, respectively, said displacement means mounted independently of said cam lever and said follower lever and operatively connected to said connecting means,
 said connecting means comprising a link extending from said cam lever to said follower lever substantially in the direction in which said cam and follower levers travel during rotation, said link defining said first and second connections,
 said displacement means comprising a movable guide connected to said link, and
 position adjusting means operably connected to said guide for moving same, said link being slidable relative to said guide.

2. A transferring mechanism according to claim 1, including a frame, said position adjusting means being mounted to said frame.

3. A transferring mechanism according to claim 1, wherein said first connection is situated substantially at a midpoint of said follower lever, such that said second axis is spaced to one side of said link, and said first axis and said transfer means are each spaced to another side of said link.

4. A transferring mechanism according to claim 1, wherein said first connection comprises a first slide slidably mounted to a first seat carried by said cam lever, said second connection comprises a second slide slidably mounted to a second seat carried by said follower lever.

5. A transferring mechanism according to claim 4, wherein said connecting means includes connector means pivotably connected at its ends to said first and second slides, respectively, for rotation relative thereto about axes oriented parallel to said first and second axes.

6. A transferring device according to claim 4, wherein said first and second seats each define a slide path for said first and second slides, and are rotatably carried by said cam lever and follower lever, respectively, for rotation about secondary axes oriented parallel to said first and second axes, and means for rotating said first and second slides relative to said cam lever and said follower lever, respectively, during rotation of said cam lever and said follower lever for maintaining said first and second slide paths mutually parallel.

7. A transferring device according to claim 1, wherein said displacement means includes a motor actuator.

8. A transferring device according to claim 1, wherein said displacement means includes a manual actuator.

9. A transferring mechanism according to claim 1, wherein said connecting means includes connector means extending in a direction parallel to said first and second axes and connected to said first and second slides for rotation relative thereto about a common axis oriented parallel to said first and second axes.

10. A transferring mechanism according to claim 9, wherein said connecting means comprises an arm rigidly coupled to said connector means, said displacement means being operably connected to said arm, said arm being slidable relative to said displacement means.

11. A transferring mechanism according to claim 1, wherein said displacement means comprises a part connected to said connecting means, a cam rotatable to different positions, and a second part connected to said first part and bearing against said cam to move said first part and said connecting means in response to movement of said cam.

12. A transferring mechanism comprising:
a cam lever rotatably mounted at a first end thereof about a first axis of rotation,
a follower lever rotatably mounted at a first end thereof about a second axis of rotation spaced from, and oriented parallel to, said first axis of rotation,
transfer means connected to a second end of said follower lever for being displaced stroke-wise during rotation of said follower lever about said second axis of rotation,
cam means for engaging said cam lever for rotating said cam lever about said first axis of rotation,
connecting means having a first connection with said cam lever and a second connection with said follower lever for transferring rotary motion from said cam lever to said follower lever,
said first connection being slidable generally along the length of said cam lever, and said second connection being slidable generally along the length of said follower lever, in order to change the stroke length of said transfer means per unit rotation of said cam lever,
displacement means for displacing said connecting means to simultaneously slide said first and second connections along said cam lever and follower lever, respectively, said displacement means mounted independently of said cam lever and said follower lever and operatively connected to said connecting means,
said first connection comprising a first slide slidably mounted to a first seat carried by said cam lever, said second connection comprising a second slide slidably mounted to a second seat carried by said follower lever,
said first and second seats each defining a slide path for said first and second slides, and being rotatably carried by said cam lever and follower lever, respectively, for rotation about secondary axes oriented parallel to said first and second axes, and
means for rotating said first and second slides relative to said cam lever and said follower lever, respectively, during rotation of said cam lever and said follower lever for maintaining said first and second slide paths mutually parallel.

* * * * *